United States Patent
Osada

(10) Patent No.: US 12,254,725 B2
(45) Date of Patent: Mar. 18, 2025

(54) LIFESPAN PREDICTION DEVICE AND LIFESPAN PREDICTION METHOD

(71) Applicant: ISUZU MOTORS LIMITED, Tokyo (JP)

(72) Inventor: Hideki Osada, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 249 days.

(21) Appl. No.: 18/024,007

(22) PCT Filed: Sep. 17, 2021

(86) PCT No.: PCT/JP2021/034229
§ 371 (c)(1),
(2) Date: Feb. 28, 2023

(87) PCT Pub. No.: WO2022/065213
PCT Pub. Date: Mar. 31, 2022

(65) Prior Publication Data
US 2023/0267783 A1    Aug. 24, 2023

(30) Foreign Application Priority Data

Sep. 23, 2020  (JP) .................... 2020-158724

(51) Int. Cl.
*G07C 5/08*  (2006.01)
(52) U.S. Cl.
CPC ........... *G07C 5/085* (2013.01); *G07C 5/0808* (2013.01)
(58) Field of Classification Search
CPC .... G07C 5/085; G07C 5/0808; G01M 17/007
See application file for complete search history.

(56) References Cited

U.S. PATENT DOCUMENTS

2014/0052299 A1   2/2014 Suzuki et al.
2022/0090672 A1*  3/2022 Yamashita ............... F16H 57/01

FOREIGN PATENT DOCUMENTS

| CN | 101393079 A   | 3/2009  |
|----|---------------|---------|
| JP | 2006-017471 A | 1/2006  |
| JP | 2012-233336 A | 11/2012 |
| JP | 2018-155517 A | 10/2018 |
| JP | 2020-042705 A | 3/2020  |
| KR | 2003-0083329 A | 10/2003 |

OTHER PUBLICATIONS

Patent Cooperation Treaty, International Search Report, Application No. PCT/JP2021/034229, dated Nov. 22, 2021, in 5 pages.
Patent Cooperation Treaty, WOSA, Application No. PCT/JP2021/034229, dated Nov. 22, 2021, in 3 pages.

* cited by examiner

*Primary Examiner* — Michael V Kerrigan
(74) *Attorney, Agent, or Firm* — PROCOPIO, CORY, HARGREAVES & SAVITCH LLP

(57) ABSTRACT

A service lifespan prediction device includes: an operation history accumulation unit; a service lifespan prediction unit; a usage range frequency calculation unit; a usage range frequency storage unit; and a deviation calculation unit. In a case where a deviation between the latest value of a usage range frequency calculated by the deviation calculation unit and a previous value of the usage range frequency is equal to or greater than a threshold value, the service lifespan prediction unit calculates a stress increase rate based only on an accumulated operation history after the latest value of the usage range frequency is calculated.

6 Claims, 7 Drawing Sheets

LIFESPAN PREDICTION DEVICE AND LIFESPAN PREDICTION METHOD

CROSS-REFERENCE TO RELATED APPLICATIONS

This application is US National Stage of International Patent Application PCT/JP2021/034229, filed Sep. 17, 2021, which claims benefit of priority from Japanese Patent Application 2020-158724, filed Sep. 23, 2020, the contents of both of which are incorporated herein by reference.

TECHNICAL FIELD

The present disclosure relates to a service lifespan prediction device and a service lifespan prediction method for predicting a service lifespan of a part that forms a vehicle.

BACKGROUND ART

Parts and components that forms a vehicle gradually deteriorates with operation, and eventually reaches the end of its service lifespan. Therefore, it is desirable to predict the service lifespan of the part so that appropriate maintenance work (for example, part replacement work) can be performed before the part reaches the end of its service lifespan.

Therefore, in the related arts, an operation history of a part is accumulated and a service lifespan of the part is predicted based on the operation history (see Patent Literatures 1 and 2, for example).

CITATION LIST

Patent Literature

Patent Literature 1: JP2012-233336A
Patent Literature 2: JP2020-042705A

SUMMARY OF INVENTION

Technical Problem

However, in the case where a service lifespan is predicted based on an operation history, for example, when a vehicle is resold and a user or an operation route of the vehicle is changed, that is, when a vehicle usage condition changes, a rate of progression at which a part deteriorates may vary greatly before and after the vehicle usage condition changes.

Therefore, when the service lifespan is predicted without considering a change in the vehicle usage condition, there is a risk that an error will increase, and thus it will be difficult to make an accurate prediction.

In view of the above circumstances, an object of the present disclosure is to provide a service lifespan prediction device and a service lifespan prediction method that can make more accurate prediction than the related art when predicting a service lifespan based on an operation history.

Solution to Problem

There is provided a service lifespan prediction device that includes an operation history accumulation unit that accumulates an operation history of a part that forms a vehicle, a service lifespan prediction unit that calculate a cumulative stress and a stress increase rate on the part based on the operation history accumulated in the operation history accumulation unit and predicts a remaining travel distance until the part reaches the end of a service lifespan based on the cumulative stress and the stress increase rate, a usage range frequency calculation unit that calculates a usage range frequency of an internal combustion engine based on a rotational speed and a load of the internal combustion engine mounted on the vehicle, a usage range frequency storage unit that stores the usage range frequency calculated by the usage range frequency calculation unit, and a deviation calculation unit that calculates deviation between a latest value of the usage range frequency stored in the usage range frequency storage unit and a previous value of the usage range frequency, in which when the deviation between the latest value of the usage range frequency calculated by the deviation calculation unit and the previous value of the usage range frequency is equal to or greater than a threshold value, the service lifespan prediction unit calculates the stress increase rate based only on the operation history accumulated after the latest value of the usage range frequency is calculated.

It is preferable that a position specifying unit that specifies a position of the vehicle, a position storage unit that stores the position specified by the position specifying unit, a usage environment specifying unit that specifies usage environment of the vehicle based on the position stored in the position storage unit, and a usage environment storage unit that stores the usage environment specified by the usage environment specifying unit are further provided, in which the deviation calculation unit calculates deviation between a latest value of the usage environment stored in the usage environment storage unit and a previous value of the usage environment, and when the deviation between the latest value of the usage environment calculated by the deviation calculation unit and the previous value of the usage environment is equal to or greater than or a threshold value, the service lifespan prediction unit calculates the stress increase rate based only on the operation history accumulated after the latest value of the usage environment is calculated.

It is preferable that the usage environment specifying unit specifies an operation route of the vehicle based on the position stored in the position storage unit, and sets the operation route as the usage environment when the operation route matches multiple times.

It is preferable that the position specifying unit specifies the position when the internal combustion engine mounted on the vehicle is cold-started, and when the position stored in the position storage unit matches multiple times, the usage environment specifying unit sets the position as the usage environment.

It is preferable that a change detection unit that detects a change in an automobile registration number plate attached to the vehicle is further provided, in which when the change detection unit detects the change in the automobile registration number plate, the service lifespan prediction unit calculates the stress increase rate based only on the operation history accumulated after the change in the automobile registration number plate is detected.

There is provided a service lifespan prediction method that includes the steps of a) accumulating an operation history of a part that forms a vehicle, b) calculating a cumulative stress and a stress increase rate on the part based on the operation history accumulated in step a) and predicting a remaining travel distance until the part reaches the end of a service lifespan based on the cumulative stress and the stress increase rate, c) calculating a usage range frequency of an internal combustion engine based on a rotational speed and a load of the internal combustion engine mounted on the vehicle, d) storing the usage range frequency calculated in step c), and e) calculating deviation between a latest value of the usage range frequency stored in step d) and a previous value of the usage range frequency, in which when the deviation between the latest value of the usage range frequency calculated in step e) and the previous value of the usage range frequency is equal to or greater than a threshold value, the stress increase rate is calculated in step b) based only on the operation history accumulated after the latest value of the usage range frequency is calculated.

Advantageous Effects of Invention

It is possible to provide a service lifespan prediction device and a service lifespan prediction method that can make more accurate prediction than the related art when predicting a service lifespan based on an operation history.

DESCRIPTION OF EMBODIMENTS

First Embodiment

Figure 1:
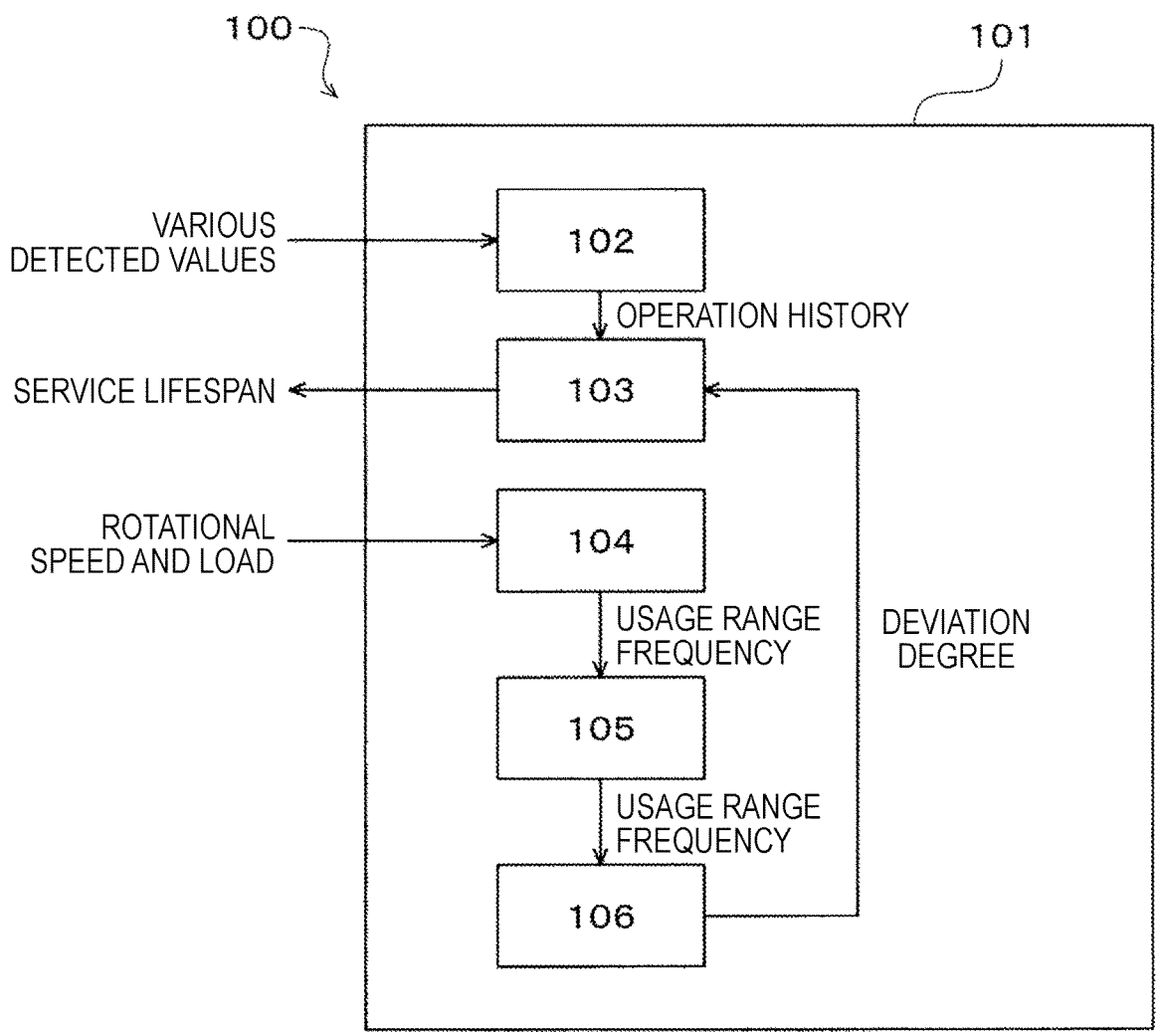
FIG. 1 is a diagram illustrating a service lifespan prediction device according to a first embodiment.

As illustrated in FIG. 1, a service lifespan prediction device 100 according to a first embodiment includes an operation history accumulation unit 102, a service lifespan prediction unit 103, a usage range frequency calculation unit 104, a usage range frequency storage unit 105, and a deviation calculation unit 106, which are respectively configured by partial functions of a control device 101. The control device 101 is, for example, an engine control unit having a central processing unit and a storage area.

The operation history accumulation unit 102 accumulates an operation history of a part (for example, a part that forms an internal combustion engine mounted on a vehicle) forms the vehicle. The operation history is changes over time in various detected values (for example, outside air temperature, vehicle travel distance, vehicle position, internal combustion engine cooling water temperature, internal combustion engine rotational speed, and/or internal combustion engine load) that cause deterioration of the part.

The service lifespan prediction unit 103 calculates a cumulative stress and a stress increase rate on the part based on the operation history accumulated in the operation history accumulation unit 102, and predicts a remaining travel distance until the part reaches the end of its service lifespan based on the cumulative stress and the stress increase rate. The cumulative stress is a total sum of loads applied to the part from the time (from a new state) the part is installed in the vehicle to the present. The stress increase rate (the amount of change in the cumulative stress per unit travel distance) is a rate at which the deterioration of the part progresses. It is desirable that the service lifespan prediction unit 103 notifies the vehicle user or manager of the remaining travel distance. When it is diagnosed that the remaining travel distance is small or that the remaining travel distance is zero (that is, the part already reaches the end of its service lifespan), the user or manager may be alerted to prompt maintenance work immediately. The remaining travel distance can also be read as a remaining operating time. When the remaining travel distance is read as the remaining operating time, the amount of change in cumulative stress per unit operating time is defined as the stress increase rate. When predicting the remaining travel distance based on the cumulative stress and the stress increase rate, the cumulative stress (service lifespan threshold value) that is assumed for the part to reach the end of its service lifespan is experimentally determined in advance, and a deterioration degree of the part is calculated based on a ratio (current cumulative stress/service lifespan threshold value×100) of the current cumulative stress to the service lifespan threshold value, and then a rate (amount of change in the deterioration degree per unit travel distance) of progression of the deterioration degree is calculated based on the stress increase rate, in such a manner that the remaining travel distance until the deterioration degree reaches 100 can be calculated. Specifically, when the current cumulative stress is 300, the service lifespan threshold value is 1,000, and the stress increase rate is 100 per 100,000 km, since the current deterioration degree is 30 and the rate of progression of the deterioration degree is 10 per 100,000 km, the remaining travel distance until the deterioration degree reaches 100 is 700,000 km if the stress increase rate does not change.

The usage range frequency calculation unit 104 calculates a usage range frequency of the internal combustion engine based on the rotational speed and the load of the internal combustion engine. The usage range frequency is a frequency of use of a load range for each rotational speed range, such as, for example, a low load range is often used in a low rotation range and the low load range to a high load range are used evenly in a high rotation range. When the vehicle usage condition changes, the usage range frequency also naturally changes. In other words, a large change in the usage range frequency means a change in the vehicle usage condition. The usage range frequency is calculated for each predetermined period, for example, one cycle from the start of the internal combustion engine to the stop. The usage range frequency storage unit 105 stores the usage range frequency calculated by the usage range frequency calculation unit 104.

The deviation calculation unit 106 calculates deviation between a latest value of the usage range frequency stored in the usage range frequency storage unit 105 and a previous value of the usage range frequency. The usage range frequency calculated in a current cycle is the latest value, and the usage range frequency calculated in a previous cycle is the previous value. The deviation can be any index as long as the index can evaluate the relevance between the latest value and the previous value, and the deviation degree is determined based on a difference between the latest value and the previous value and the degree of matching rate between the latest value and the previous value.

In the related art, the service lifespan is predicted without considering a change in the vehicle usage condition, so there is a risk of large errors, and as a result, accurate prediction is difficult.

In the service lifespan prediction device 100, when the deviation, which is calculated by the deviation calculation unit 106, between the latest value of the usage range frequency and the previous value of the usage range frequency is equal to or greater than the threshold value, the service lifespan prediction unit 103 calculates the stress increase rate based only on the operation history accumulated after the latest value of the usage range frequency is calculated. That is, the rate of progression at which the part deteriorates may vary greatly before and after the vehicle usage condition changes. Therefore, when the remaining travel distance is predicted without considering the change in the rate of progression at which the part deteriorates, it will be difficult to accurately predict the remaining travel distance. Thus, in the service lifespan prediction device 100, the operation history accumulated before the vehicle usage condition changes and the operation history accumulated after the vehicle usage condition changes are divided from each other, and the stress increase rate is calculated based only on the operation history accumulated after the vehicle usage condition changes. The threshold value is experimentally determined in advance so that the change in the vehicle usage condition and the change in the usage range frequency can be accurately associated. In addition, regardless of whether the vehicle usage condition changes or not, the cumulative stress is the total sum of the loads applied to the part from the time (from a new state) the part is installed in the vehicle to the present. Thus, the cumulative stress does not decrease or disappear due to the change in the vehicle usage condition, so it needs to be calculated based on all operation histories.

Therefore, in the service lifespan prediction device 100, when the deviation between the latest value of the usage range frequency and the previous value of the usage range frequency is equal to or greater than the threshold value, the stress increase rate is calculated based only on the operation history accumulated after the latest value of the usage range frequency is calculated. Also, the cumulative stress is calculated based on the operation history before the latest value of the usage range frequency is calculated and the operation history after the latest value of the usage range frequency is calculated. For example, in the above-described example, it is supposed that when the deterioration degree is 30, the vehicle usage condition changes and the rate at which the deterioration of the part progresses, that is, the stress increase rate changes by 200 per 100,000 km, and the vehicle travels another 100,000 km. The current cumulative stress is calculated as follows: "cumulative stress before the vehicle usage condition changes" 300+"cumulative stress after the vehicle usage condition changes" 200=500 based on the operation history before the vehicle usage condition changes and the operation history after the vehicle usage condition changes, and the stress increase rate is calculated to be 200 per 100,000 km based only on the operation history after the vehicle usage condition changes. Further, the rate of progression of the deterioration degree is calculated to be 20 per 100,000 km, and the current deterioration degree is calculated as follows: "deterioration degree before the vehicle usage condition changes" 30+"deterioration degree after the vehicle usage condition changes" 20=50. Ultimately, the remaining travel distance is calculated as follows: deterioration degree until the part reaches the end of its service lifespan 50/rate of progression of the deterioration degree 20 per 100,000 km=250,000 km.

The method of the related art predicts the service lifespan without considering the change in the vehicle usage condition. For example, in the above-described example, the current cumulative stress is 500, and the travel distance until reaching the cumulative stress is calculated as follows: "travel distance before the vehicle usage condition changes" 300,000 km+"travel distance after the vehicle usage condition changes" 100,000 km=400,000 km. Therefore, the stress increase rate is calculated to be 125 per 100,000 km, and the rate of progression of the deterioration degree is calculated to be 12.5 per 100,000 km. Therefore, the remaining travel distance is calculated as follows: deterioration degree until the part reaches the end of its service lifespan 50/rate of progression of the deterioration degree 12.5 per 100,000 km=400,000 km. Thus, the remaining travel distance is far from the accurate remaining travel distance of 250,000 km calculated by the service lifespan prediction device 100.

Figure 2:
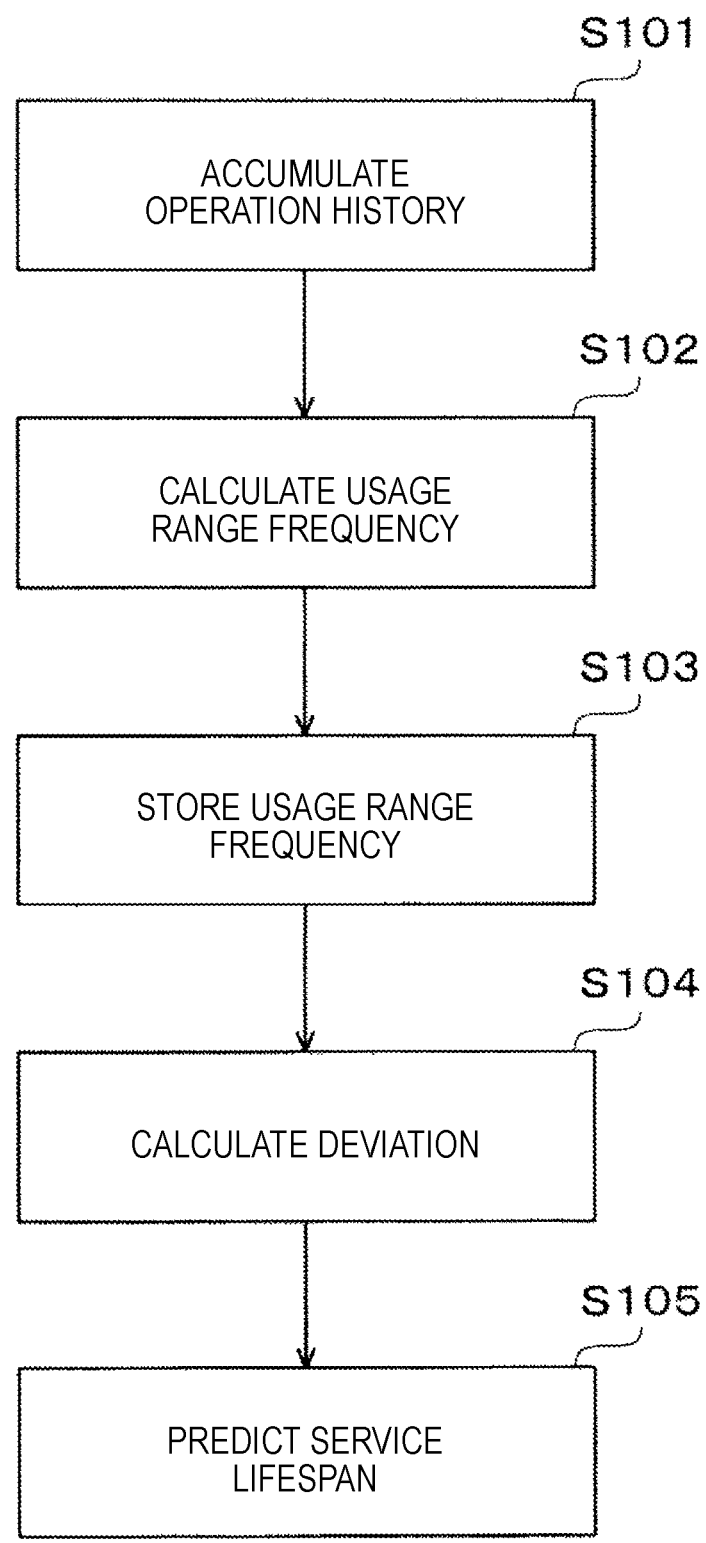
FIG. 2 is a diagram illustrating a service lifespan prediction method implemented by the service lifespan prediction device of FIG. 1.

As illustrated in FIG. 2, a service lifespan prediction method M100 implemented by the service lifespan prediction device 100 includes an operation history accumulation step S101, a usage range frequency calculation step S102, a usage range frequency storage step S103, a deviation calculation step S104, and a service lifespan prediction step S105. The main difference from the related art is that the usage range frequency storage step S103 and the deviation calculation step S104 are further provided between the operation history accumulation step S101 and the service lifespan prediction step S105.

In the operation history accumulation step S101, the operation history accumulation unit 102 accumulates the operation history of the part that forms the vehicle. In the usage range frequency calculation step S102, the usage range frequency calculation unit 104 calculates the usage range frequency of the internal combustion engine based on the rotational speed and the load of the internal combustion engine mounted on the vehicle.

In the usage range frequency storage step S103, the usage range frequency storage unit 105 stores the usage range frequency calculated in the usage range frequency calculation step S102. In the deviation calculation step S104, the deviation calculation unit 106 calculates the deviation between the latest value of the usage range frequency stored in the usage range frequency storage step S103 and the previous value of the usage range frequency. When the usage range frequency is calculated for the first time and the previous value does not exist, it is determined that there is no deviation in the deviation calculation step S104.

In the service lifespan prediction step S105, the service lifespan prediction unit 103 calculates the cumulative stress and the stress increase rate on the part based on the operation history accumulated in the operation history accumulation step S101, and predicts the remaining travel distance until the part reaches the end of its service lifespan based on the cumulative stress and the stress increase rate. Here, when the deviation between the latest value of the usage range frequency calculated in the deviation calculation step S104 and the previous value of the usage range frequency is equal to or greater than the threshold value, the stress increase rate is calculated based only on the operation history accumulated after the latest value of the usage range frequency is calculated. On the other hand, when the deviation between the latest value of the usage range frequency calculated in the deviation calculation step S104 and the previous value of the usage range frequency is less than the threshold value, not only the operation history accumulated after the latest value of the usage range frequency is calculated, but also the operation history accumulated before the latest value of the usage range frequency is calculated is used to calculate the stress increase rate.

Therefore, according to the service lifespan prediction device 100 and the service lifespan prediction method M100 implemented by the service lifespan prediction device 100, the stress increase rate is calculated based only on the operation history accumulated after the vehicle usage condition changes, without using the operation history accumulated before the vehicle usage condition changes to calculate the stress increase rate. Therefore, when predicting the remaining travel distance until the part reaches the end of its service lifespan based on the cumulative stress and the stress increase rate, it is possible to predict more accurately than the related art.

Second Embodiment

Figure 3:
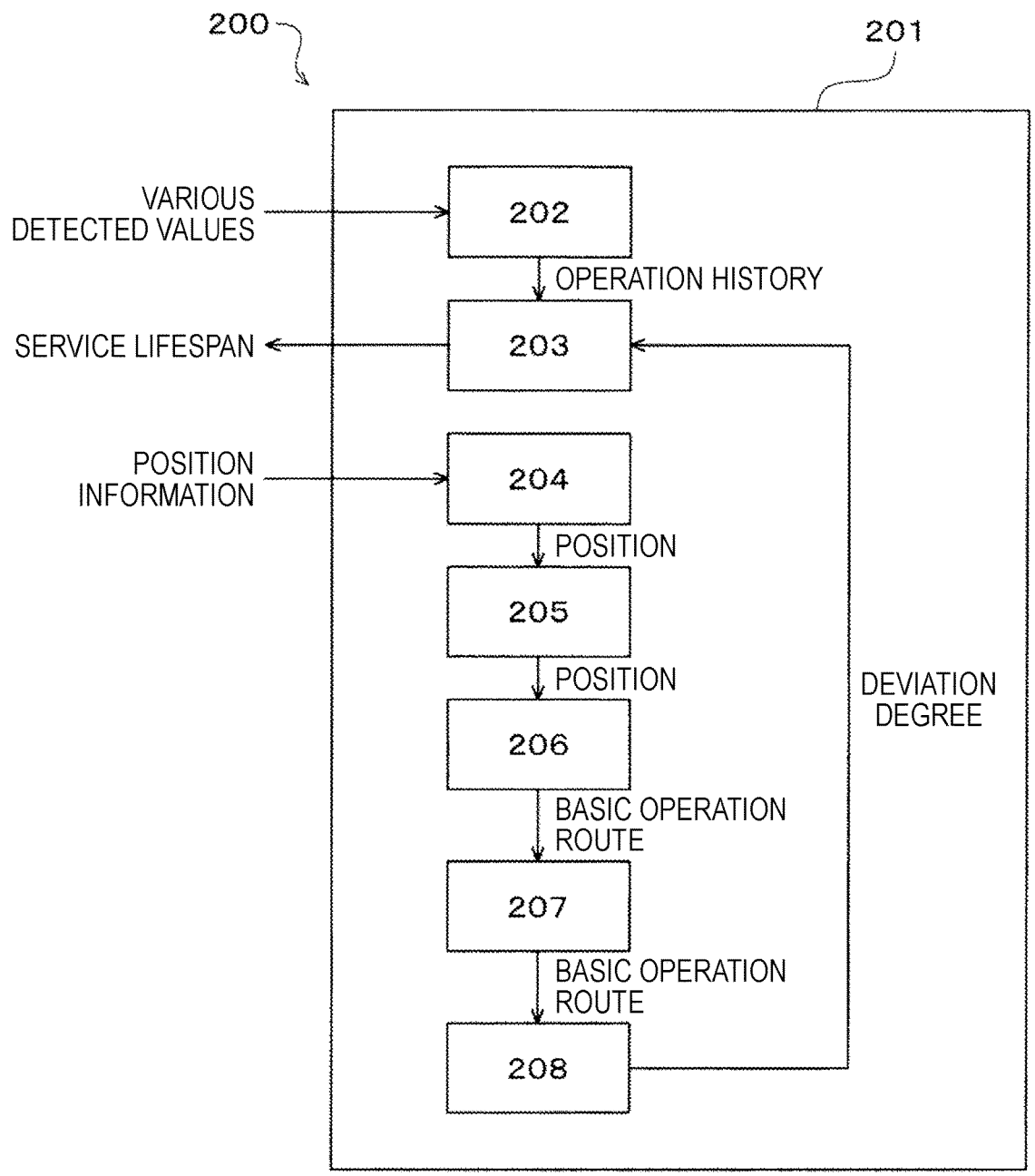
FIG. 3 is a diagram illustrating a service lifespan prediction device according to a second embodiment.

As illustrated in FIG. 3, a service lifespan prediction device 200 according to a second embodiment includes an operation history accumulation unit 202, a service lifespan prediction unit 203, a position specifying unit 204, a position storage unit 205, a basic operation route specifying unit 206 that is one aspect of a usage environment specifying unit, a basic operation route storage unit 207 that is one aspect of a usage environment storage unit, and a deviation calculation unit 208, which are respectively configured by partial functions of a control device 201. The control device 201 is, for example, an engine control unit having a central processing unit and a storage area.

The operation history accumulation unit 202 accumulates an operation history of a part that forms a vehicle. The operation history is changes over time in various detected values (for example, outside air temperature, vehicle travel distance, vehicle position, cooling water temperature of the internal combustion engine mounted on the vehicle, internal combustion engine rotational speed, and/or internal combustion engine load) that cause deterioration of the part.

The service lifespan prediction unit 203 calculates a cumulative stress and a stress increase rate on the part based on the operation history accumulated in the operation history accumulation unit 202, and predicts a remaining travel distance until the part reaches the end of its service lifespan based on the cumulative stress and the stress increase rate. The cumulative stress is a total sum of loads applied to the part from the time (from a new state) the part is installed in the vehicle to the present. The stress increase rate (the amount of change in the cumulative stress per unit travel distance) is a rate at which the deterioration of the part progresses. It is desirable that the service lifespan prediction unit 203 notifies the vehicle user or manager of the remaining travel distance. When it is diagnosed that the remaining travel distance is small or that the remaining travel distance is zero (that is, the part already reaches the end of its service lifespan), the user or manager may be alerted to prompt maintenance work immediately. The remaining travel distance can also be read as a remaining operating time. When the remaining travel distance is read as the remaining operating time, the amount of change in cumulative stress per unit operating time is defined as the stress increase rate. When predicting the remaining travel distance based on the cumulative stress and the stress increase rate, the cumulative stress (service lifespan threshold value) that is assumed for the part to reach the end of its service lifespan is experimentally determined in advance, and a deterioration degree of the part is calculated based on a ratio (current cumulative stress/service lifespan threshold value×100) of the current cumulative stress to the service lifespan threshold value, and then a rate (amount of change in the deterioration degree per unit travel distance) of progression of the deterioration degree is calculated based on the stress increase rate, in such a manner that the remaining travel distance until the deterioration degree reaches 100 can be calculated.

The position specifying unit 204 specifies the position of the vehicle at predetermined time intervals (for example, every few seconds) by using position information of a global positioning system, for example. The position storage unit 205 stores the position specified by the position specifying unit 204.

Based on the position stored in the position storage unit 205, the basic operation route specifying unit 206 specifies a basic operation route of the vehicle, which is one aspect of usage environment of the vehicle. Specifically, based on the position stored in the position storage unit 205, the operation route of the vehicle (for example, a route formed by connecting a plurality of positions in chronological order stored from the start of the internal combustion engine to the stop) is specified, and then when the operation route matches multiple times (that is, when it is assumed that the vehicle is operated on the same operation route multiple times), the operation route is set as the basic operation route. The basic operation route storage unit 207 stores the basic operation route specified by the basic operation route specifying unit 206.

The deviation calculation unit 208 calculates deviation between a latest value of the basic operation route stored in the basic operation route storage unit 207 and a previous value of the basic operation route. The most recently specified basic operation route is the latest value, and the basic operation route specified immediately before the latest value is the previous value. The deviation can be any index as long as the index can evaluate the relevance between the latest value and the previous value, and the deviation degree is determined based on a difference between the latest value and the previous value and the degree of matching rate between the latest value and the previous value. When the vehicle usage condition changes, the basic operation route naturally changes. In other words, a large change in the basic operation route means a change in the vehicle usage condition.

In the service lifespan prediction device 200, when the deviation, which is calculated by the deviation calculation unit 208, between the latest value of the basic operation route and the previous value of the basic operation route is equal to or greater than the threshold value, the service lifespan prediction unit 203 calculates the stress increase rate based only on the operation history accumulated after the latest value of the basic operation route is specified. That is, the rate of progression at which the part deteriorates may vary greatly before and after the vehicle usage condition changes. Therefore, when the remaining travel distance is predicted without considering the change in the rate of progression at which the part deteriorates, it will be difficult to accurately predict the remaining travel distance. Thus, in the service lifespan prediction device 200, the operation history accumulated before the vehicle usage condition changes and the operation history accumulated after the vehicle usage condition changes are divided from each other, and the stress increase rate is calculated based only on the operation history accumulated after the vehicle usage condition changes. The threshold value is experimentally determined in advance so that the change in the vehicle usage condition and the change in the basic operation route can be accurately associated. In addition, regardless of whether the vehicle usage condition changes or not, the cumulative stress is the total sum of the loads applied to the part from the time (from a new state) the part is installed in the vehicle to the present. Thus, the cumulative stress does not decrease or disappear due to the change in the vehicle usage condition, so it needs to be calculated based on all operation histories.

Therefore, in the service lifespan prediction device 200, when the deviation between the latest value of the basic operation route and the previous value of the basic operation route is equal to or greater than the threshold value, the stress increase rate is calculated based only on the operation history accumulated after the latest value of the basic operation route is specified. Also, the cumulative stress is calculated based on the operation history before the latest value of the basic operation route is specified and the operation history after the latest value of the basic operation route is specified.

Figure 4:
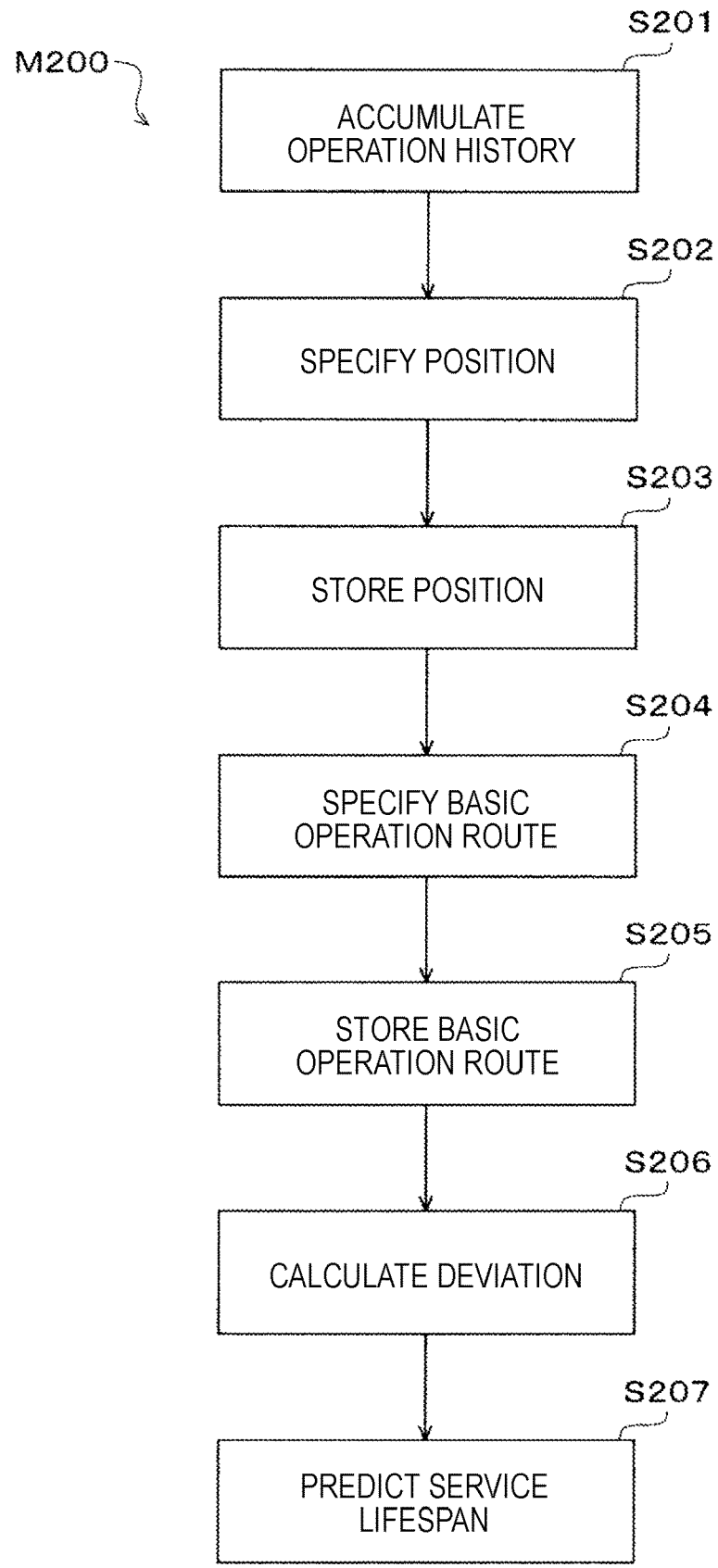
FIG. 4 is a diagram illustrating a service lifespan prediction method implemented by the service lifespan prediction device of FIG. 3.

As illustrated in FIG. 4, a service lifespan prediction method M200 implemented by the service lifespan prediction device 200 includes an operation history accumulation step S201, a position specifying step S202, a position storage step S203, a basic operation route specifying step S204, a basic operation route storage step S205, a deviation calculation step S206, and a service lifespan prediction step S207. The main difference from the related art is that the position specifying step S202, the position storage step S203, the basic operation route specifying step S204, the basic operation route storage step S205, and the deviation calculation step S206 are further provided between the operation history accumulation step S201 and the service lifespan prediction step S207.

In the operation history accumulation step S201, the operation history accumulation unit 202 accumulates the operation history of the part that forms the vehicle. In the position specifying step S202, the position specifying unit 204 specifies the position of the vehicle. In the position storage step S203, the position storage unit 205 stores the position specified in the position specifying step S202.

In the basic operation route specifying step S204, the basic operation route specifying unit 206 specifies the basic operation route of the vehicle based on the position stored in the position storage step S203. In the basic operation route storage step S205, the basic operation route storage unit 207 stores the basic operation route specified in the basic operation route specifying step S204. Further, in the basic operation route specifying step S204, the operation route of the vehicle is specified based on the position stored in the position storage step S203, and when the operation route matches multiple times, the operation route is set as the basic operation route.

In the deviation calculation step S206, the deviation calculation unit 208 calculates the deviation between the latest value of the basic operation route stored in the basic operation route storage step S205 and the previous value of the basic operation route. When the basic operation route is specified for the first time and the previous value does not exist, it is determined that there is no deviation in the deviation calculation step S206.

In the service lifespan prediction step S207, the service lifespan prediction unit 203 calculates the cumulative stress and the stress increase rate on the part based on the operation history accumulated in the operation history accumulation step S201, and predicts the remaining travel distance until the part reaches the end of its service lifespan based on the cumulative stress and the stress increase rate. Here, when the deviation between the latest value of the basic operation route calculated in the deviation calculation step S206 and the previous value of the basic operation route is equal to or greater than the threshold value, the stress increase rate is calculated based only on the operation history accumulated after the latest value of the basic operation route is specified. On the other hand, when the deviation between the latest value of the basic operation route calculated in the deviation calculation step S206 and the previous value of the basic operation route is less than the threshold value, not only the operation history accumulated after the latest value of the basic operation route is specified, but also the operation history accumulated before the latest value of the basic operation route is specified is used to calculate the stress increase rate.

Therefore, according to the service lifespan prediction device 200 and the service lifespan prediction method M200 implemented by the service lifespan prediction device 200, the stress increase rate is calculated based only on the operation history accumulated after the vehicle usage condition changes, without using the operation history accumulated before the vehicle usage condition changes to calculate the stress increase rate. Therefore, when predicting the remaining travel distance until the part reaches the end of its service lifespan based on the cumulative stress and the stress increase rate, it is possible to predict more accurately than the related art.

Third Embodiment

Figure 5:
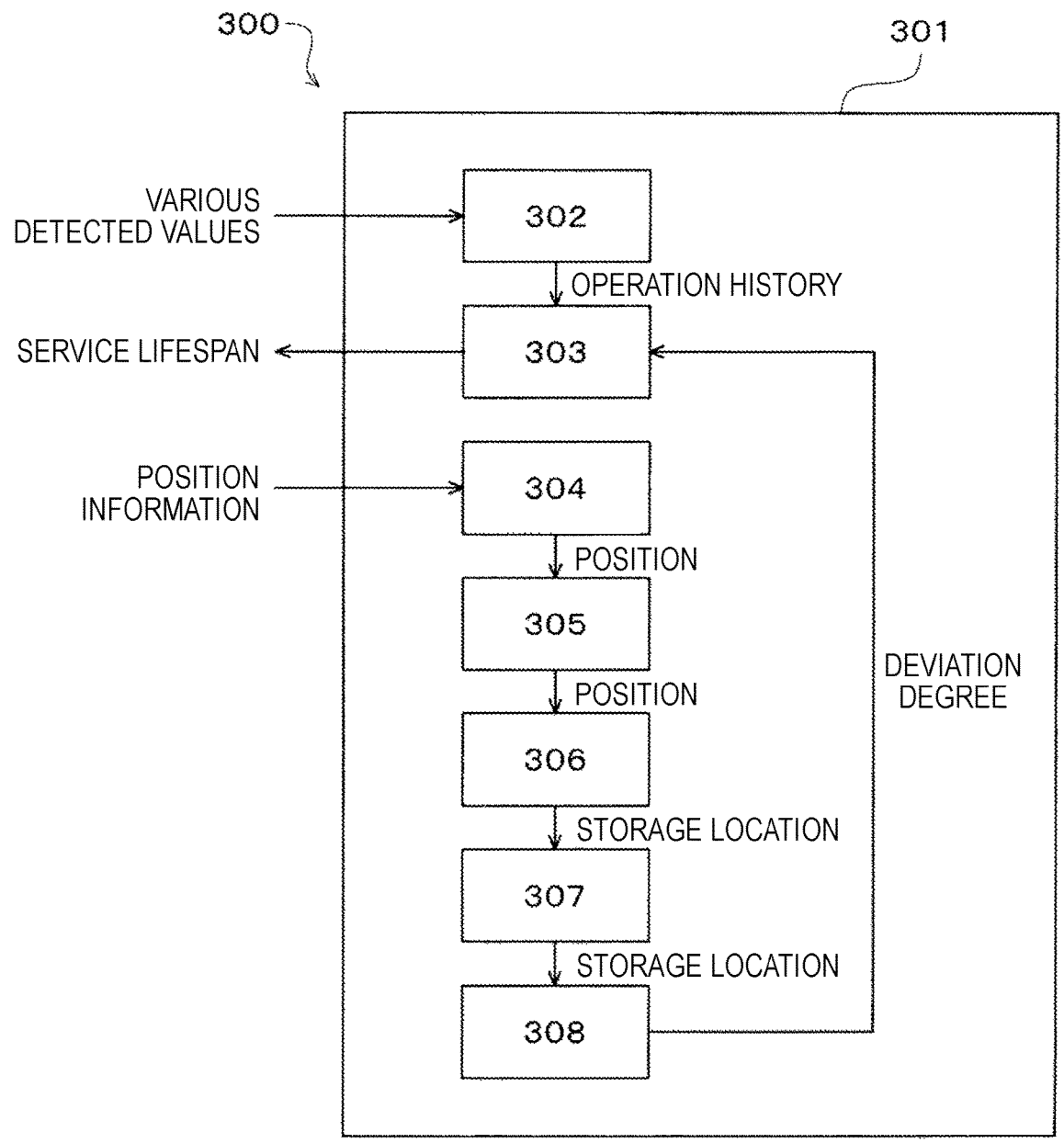
FIG. 5 is a diagram illustrating a service lifespan prediction device according to a third embodiment.

As illustrated in FIG. 5, a service lifespan prediction device 300 according to a third embodiment includes an operation history accumulation unit 302, a service lifespan prediction unit 303, a position specifying unit 304, a position storage unit 305, a storage location specifying unit 306 that is one aspect of the usage environment specifying unit, a storage location storage unit 307 that is one aspect of a usage environment storage unit, and a deviation calculation unit 308, which are respectively configured by partial functions of a control device 301. The control device 301 is, for example, an engine control unit having a central processing unit and a storage area.

The operation history accumulation unit 302 accumulates an operation history of a part that forms a vehicle. The operation history is changes over time in various detected values (for example, outside air temperature, vehicle travel distance, vehicle position, cooling water temperature of the internal combustion engine mounted on the vehicle, internal combustion engine rotational speed, and/or internal combustion engine load) that cause deterioration of the part.

The service lifespan prediction unit 303 calculates a cumulative stress and a stress increase rate on the part based on the operation history accumulated in the operation history accumulation unit 302, and predicts a remaining travel distance until the part reaches the end of its service lifespan based on the cumulative stress and the stress increase rate. The cumulative stress is a total sum of loads applied to the part from the time (from a new state) the part is installed in the vehicle to the present. The stress increase rate (the amount of change in the cumulative stress per unit travel distance) is a rate at which the deterioration of the part progresses. It is desirable that the service lifespan prediction unit 303 notifies the vehicle user or manager of the remaining travel distance. When it is diagnosed that the remaining travel distance is small or that the remaining travel distance is zero (that is, the part already reaches the end of its service lifespan), the user or manager may be alerted to prompt maintenance work immediately. The remaining travel distance can also be read as a remaining operating time. When the remaining travel distance is read as the remaining operating time, the amount of change in cumulative stress per unit operating time is defined as the stress increase rate. When predicting the remaining travel distance based on the cumulative stress and the stress increase rate, the cumulative stress (service lifespan threshold value) that is assumed for the part to reach the end of its service lifespan is experimentally determined in advance, and a deterioration degree of the part is calculated based on a ratio (current cumulative stress/service lifespan threshold value×100) of the current cumulative stress to the service lifespan threshold value, and then a rate (amount of change in the deterioration degree per unit travel distance) of progression of the deterioration degree is calculated based on the stress increase rate, in such a manner that the remaining travel distance until the deterioration degree reaches 100 can be calculated.

The position specifying unit 304 specifies the position (that is, the position where the vehicle is assumed to be parked for a long time) of the vehicle when the internal combustion engine mounted on the vehicle is cold-started by using position information of a global positioning system, for example. The position storage unit 305 stores the position specified by the position specifying unit 304.

The storage location specifying unit 306 specifies a vehicle storage location, which is one aspect of the vehicle usage environment, based on the position stored in the position storage unit 305. Specifically, the fact that the vehicle is parked in the same position for a long time means that there is a high possibility that the position is a storage location. Therefore, when the position stored in the position storage unit 305 matches multiple times, the position is set as the storage location. The storage location storage unit 307 stores the storage location specified by the storage location specifying unit 306.

The deviation calculation unit 308 calculates deviation between a latest value of the storage location stored in the storage location storage unit 307 and a previous value of the storage location. The most recently specified storage location is the latest value, and the storage location specified immediately before the latest value is the previous value. The deviation can be any index as long as the index can evaluate the relevance between the latest value and the previous value, and the deviation degree is determined based on a difference between the latest value and the previous value and the degree of matching rate between the latest value and the previous value. When the user of the vehicle is changed, the storage location is naturally changed. In other words, a large change in the storage location means a change of the user.

In the service lifespan prediction device 300, when the deviation, which is calculated by the deviation calculation unit 308, between the latest value of the storage location and the previous value of the storage location is equal to or greater than the threshold value, the service lifespan prediction unit 303 calculates the stress increase rate based only on the operation history accumulated after the latest value of the storage location is specified. That is, the rate of progression at which the part deteriorates may vary greatly before and after the vehicle usage condition changes. Therefore, when the remaining travel distance is predicted without considering the change in the rate of progression at which the part deteriorates, it will be difficult to accurately predict the remaining travel distance. Thus, in the service lifespan prediction device 300, the operation history accumulated before the vehicle usage condition changes and the operation history accumulated after the vehicle usage condition changes are divided from each other, and the stress increase rate is calculated based only on the operation history accumulated after the vehicle usage condition changes. The threshold value is experimentally determined in advance so that the change in the vehicle usage condition and the change in the storage location can be accurately associated. In addition, regardless of whether the vehicle usage condition changes or not, the cumulative stress is the total sum of the loads applied to the part from the time (from a new state) the part is installed in the vehicle to the present. Thus, the cumulative stress does not decrease or disappear due to the change in the vehicle usage condition, so it needs to be calculated based on all operation histories.

Therefore, in the service lifespan prediction device 300, when the deviation between the latest value of the storage location and the previous value of the storage location is equal to or greater than the threshold value, the stress increase rate is calculated based only on the operation history accumulated after the latest value of the storage location is specified. Also, the cumulative stress is calculated based on the operation history before the latest value of the storage location is specified and the operation history after the latest value of the storage location is specified.

Figure 6:
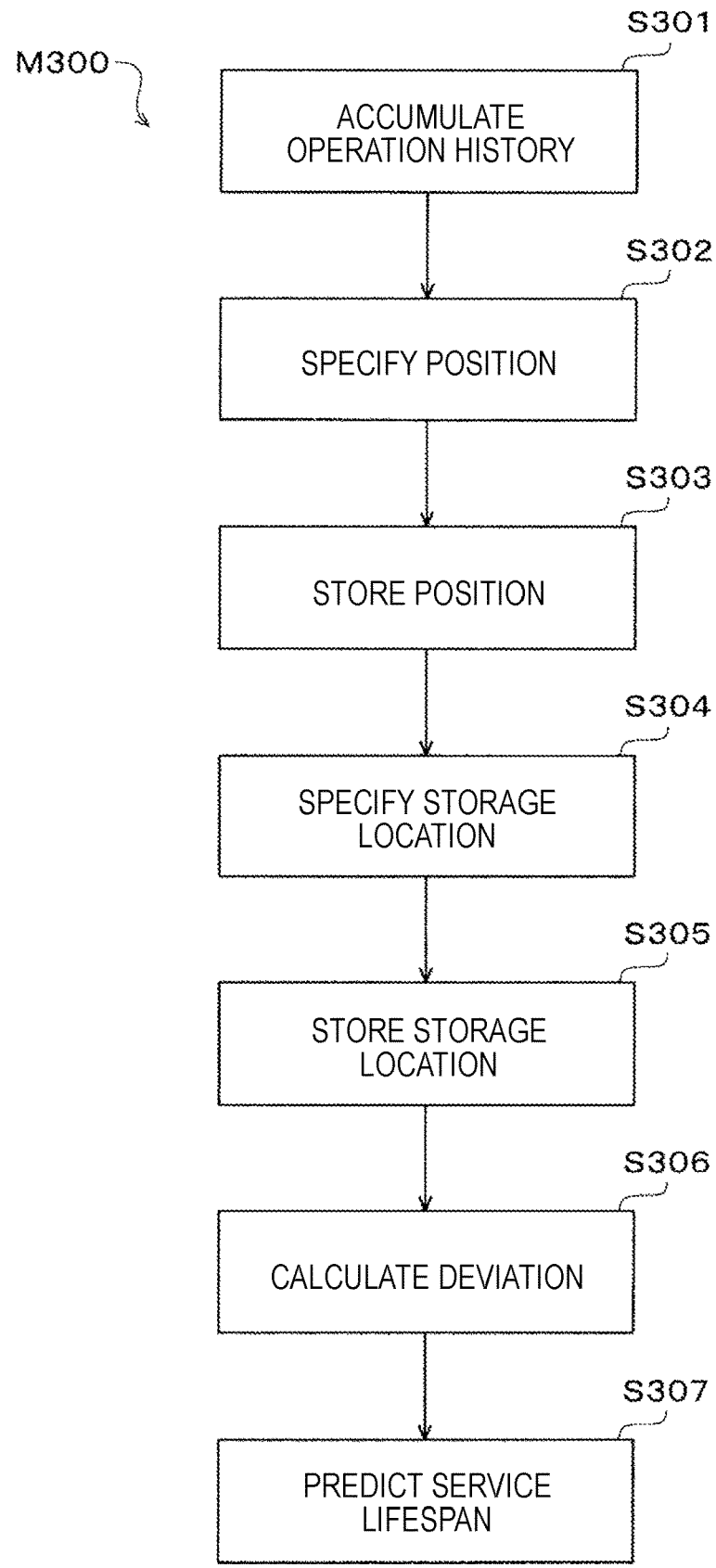
FIG. 6 is a diagram illustrating a service lifespan prediction method implemented by the service lifespan prediction device of FIG. 5.

As illustrated in FIG. 6, a service lifespan prediction method M300 implemented by the service lifespan prediction device 300 includes an operation history accumulation step S301, a position specifying step S302, a position storage step S303, a storage location specifying step S304, a storage location storage step S305, a deviation calculation step S306, and a service lifespan prediction step S307. The main difference from the related art is that the position specifying step S302, the position storage step S303, the storage location specifying step S304, the storage location storage step S305, and the deviation calculation step S306 are further provided between the operation history accumulation step S301 and the service lifespan prediction step S307.

In the operation history accumulation step S301, the operation history accumulation unit 302 accumulates the operation history of the part that forms the vehicle. In the position specifying step S302, the position specifying unit 304 specifies the position of the vehicle. In the position storage step S303, the position storage unit 305 stores the position specified in the position specifying step S302. In the position specifying step S302, the position when the internal combustion engine mounted on the vehicle is cold-started is specified.

In the storage location specifying step S304, the storage location specifying unit 306 specifies the vehicle storage location based on the position stored in the position storage step S303. In the storage location storage step S305, the storage location storage unit 307 stores the storage location specified in the storage location specifying step S304. Further, in the storage location specifying step S304, when the position stored in the position storage step S303 matches multiple times, the position is set as the storage location.

In the deviation calculation step S306, the deviation calculation unit 308 calculates the deviation between the latest value of the storage location stored in the storage location storage step S305 and the previous value of the storage location. When the storage location is specified for the first time and the previous value does not exist, it is determined that there is no deviation in the deviation calculation step S306.

In the service lifespan prediction step S307, the service lifespan prediction unit 303 calculates the cumulative stress and the stress increase rate on the part based on the operation history accumulated in the operation history accumulation step S301, and predicts the remaining travel distance until the part reaches the end of its service lifespan based on the cumulative stress and the stress increase rate. Here, when the deviation between the latest value of the storage location calculated in the deviation calculation step S306 and the previous value of the storage location is equal to or greater than the threshold value, the stress increase rate is calculated based only on the operation history accumulated after the latest value of the storage location is specified. On the other hand, when the deviation between the latest value of the storage location calculated in the deviation calculation step S306 and the previous value of the storage location is less than the threshold value, not only the operation history accumulated after the latest value of the storage location is specified, but also the operation history accumulated before the latest value of the storage location is specified is used to calculate the stress increase rate.

Therefore, according to the service lifespan prediction device 300 and the service lifespan prediction method M300 implemented by the service lifespan prediction device 300, the stress increase rate is calculated based only on the operation history accumulated after the vehicle usage condition changes, without using the operation history accumulated before the vehicle usage condition changes to calculate the stress increase rate. Therefore, when predicting the remaining travel distance until the part reaches the end of its service lifespan based on the cumulative stress and the stress increase rate, it is possible to predict more accurately than the related art.

Fourth Embodiment

Figure 7:
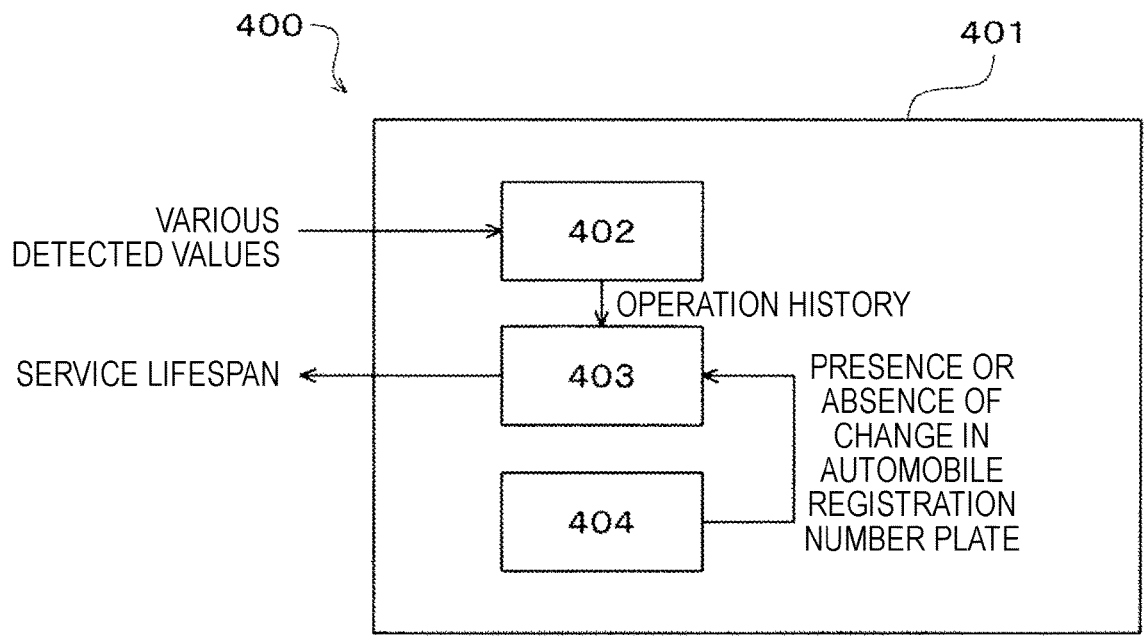
FIG. 7 is a diagram illustrating a service lifespan prediction device according to a fourth embodiment.

As illustrated in FIG. 7, a service lifespan prediction device 400 according to a fourth embodiment includes an operation history accumulation unit 402, a service lifespan prediction unit 403, and a change detection unit 404, which are respectively configured by partial functions of a control device 401. The control device 401 is, for example, an engine control unit having a central processing unit and a storage area.

The operation history accumulation unit 402 accumulates an operation history of a part that forms a vehicle. The operation history is changes over time in various detected values (for example, outside air temperature, vehicle travel distance, vehicle position, cooling water temperature of the internal combustion engine mounted on the vehicle, internal combustion engine rotational speed, and/or internal combustion engine load) that cause deterioration of the part.

The service lifespan prediction unit 403 calculates a cumulative stress and a stress increase rate on the part based on the operation history accumulated in the operation history accumulation unit 402, and predicts a remaining travel distance until the part reaches the end of its service lifespan based on the cumulative stress and the stress increase rate. The cumulative stress is a total sum of loads applied to the part from the time (from a new state) the part is installed in the vehicle to the present. The stress increase rate (the amount of change in cumulative stress per unit travel distance) is a rate at which the deterioration of the part progresses. It is desirable that the service lifespan prediction unit 403 notifies the vehicle user or manager of the remaining travel distance. When it is diagnosed that the remaining travel distance is small or that the remaining travel distance is zero (that is, the part already reaches the end of its service lifespan), a warning may be given to the user or manager to have maintenance work carried out immediately. The remaining travel distance can also be read as a remaining operating time. When the remaining travel distance is read as the remaining operating time, the amount of change in cumulative stress per unit operating time is defined as a stress increase rate. When predicting the remaining travel distance based on the cumulative stress and the stress increase rate, the cumulative stress (service lifespan threshold value) that is assumed for the part to reach the end of its service lifespan is experimentally determined in advance, and a deterioration degree of the part is calculated based on a ratio (current cumulative stress/service lifespan threshold value×100) of the current cumulative stress to the service lifespan threshold value, and then a rate (amount of change in the deterioration degree per unit travel distance) of progression of the deterioration degree is calculated based on the stress increase rate, in such a manner that the remaining travel distance until the deterioration degree reaches 100 can be calculated.

The change detection unit 404 detects a change in an automobile registration number plate attached to the vehicle. Specifically, the change in the automobile registration number plate is detected when the automobile registration number plate is removed from the vehicle or when an automobile registration number written on the automobile registration number plate is changed. For example, by using a sensor that detects attachment and detachment of the automobile registration number plate, it is possible to grasp that the automobile registration number plate is removed from the vehicle, and by using a camera that monitors the change in the automobile registration number, it is possible to grasp that the automobile registration number is changed. When the user of the vehicle is changed, the automobile registration number plate is naturally changed. In other words, the change in the automobile registration number plate means a change of the user.

In the service lifespan prediction device 400, when the change detection unit 404 detects the change in the automobile registration number plate, the service lifespan prediction unit 403 calculates the stress increase rate based only on the operation history accumulated after the change in the automobile registration number plate is detected. That is, the rate of progression at which the part deteriorates may vary greatly before and after the vehicle usage condition changes. Therefore, when the remaining travel distance is predicted without considering the change in the rate of progression at which the part deteriorates, it will be difficult to accurately predict the remaining travel distance. Thus, in the service lifespan prediction device 400, the operation history accumulated before the vehicle usage condition changes and the operation history accumulated after the vehicle usage condition changes are divided from each other, and the stress increase rate is calculated based only on the operation history accumulated after the vehicle usage condition changes. In addition, whether the vehicle usage condition changes or not, the cumulative stress is the total sum of the loads applied to the part from the time (from a new state) the part is installed in the vehicle to the present. Thus, the cumulative stress does not decrease or disappear due to the change in the vehicle usage condition, so it must be calculated based on all operation histories.

Therefore, in the service lifespan prediction device 400, when the change in the automobile registration number plate is detected, the stress increase rate is calculated based only on the operation history accumulated after the change in the automobile registration number plate is detected. In addition, the cumulative stress is calculated based on the operation history before the change in the automobile registration number plate is detected and the operation history after the change in the automobile registration number plate is detected.

Figure 8:
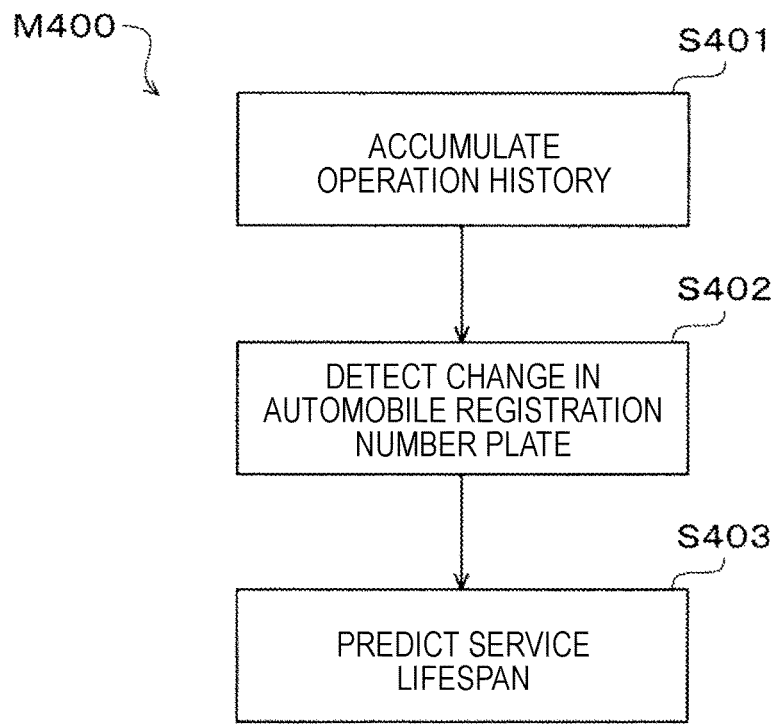
FIG. 8 is a diagram illustrating a service lifespan prediction method implemented by the service lifespan prediction device of FIG. 7.

As illustrated in FIG. 8, a service lifespan prediction method M400 implemented by the service lifespan prediction device 400 includes an operation history accumulation step S401, a change detection step S402, and a service lifespan prediction step S403. The main difference from the related art is that the change detection step S402 is further provided between the operation history accumulation step S401 and the service lifespan prediction step S403.

In the operation history accumulation step S401, the operation history accumulation unit 402 accumulates the operation history of the part that forms the vehicle. In the change detection step S402, the change detection unit 404 detects the change in the automobile registration number plate attached to the vehicle. In the change detection step S402, the change in the automobile registration number plate is detected when the automobile registration number plate is removed from the vehicle or when the automobile registration number written on the vehicle registration number plate is changed.

In the service lifespan prediction step S403, the service lifespan prediction unit 403 calculates the cumulative stress and the stress increase rate on the part based on the operation history accumulated in the operation history accumulation step S401, and predicts the remaining travel distance until the part reaches the end of its service lifespan based on the cumulative stress and the stress increase rate. Here, when the change in the automobile registration number plate is detected in the change detection step S402, the stress increase rate is calculated based only on the operation history accumulated after the change in the automobile registration number plate is detected. On the other hand, when no change in the automobile registration number plate is detected in the change detection step S402, all operation histories that are accumulated from the time (from a new state) the part is installed in the vehicle to the present are used to calculate the stress increase rate.

Therefore, according to the service lifespan prediction device 400 and the service lifespan prediction method M400 implemented by the service lifespan prediction device 400, the stress increase rate is calculated based only on the operation history accumulated after the vehicle usage condition changes, without using the operation history accumulated before the vehicle usage condition changes to calculate the stress increase rate. Therefore, when predicting the remaining travel distance until the part reaches the end of its service lifespan based on the cumulative stress and the stress increase rate, it is possible to predict more accurately than the related art.

In the above-described embodiments, all processes are completed only by the control devices 101, 201, 301, and 401. For example, based on various detected values obtained by the vehicle, a computer located at a different location from the vehicle may predict the remaining travel distance, and transmit the predicted remaining travel distance to the vehicle. That is, the vehicle does not necessarily have to complete all processes.

As described above, according to the present invention, in the case where the vehicle usage condition changes, when calculating the cumulative stress, all operation histories before and after the vehicle usage condition changes are used, but when calculating the stress increase rate, only the operation history after the vehicle usage condition changes is used. Therefore, even when the rate of progression at which the part deteriorates changes before and after the vehicle usage condition changes, it is possible to accurately predict the remaining travel distance until the part reaches the end of its service life span.

This application is based on a Japanese patent application (Japanese Patent Application No. 2020-158724) filed on Sep. 23, 2020, the contents of which are incorporated herein by reference.

INDUSTRIAL APPLICABILITY

A service lifespan prediction device and a service lifespan prediction method of the present disclosure are useful in that more accurate prediction than the related art can be made when predicting a service lifespan based on an operation history.

REFERENCE SIGNS LIST

100, 200, 300, 400: service lifespan prediction device
101, 201, 301, 401: control device
102, 202, 302, 402: operation history accumulation unit
103, 203, 303, 403: service lifespan prediction unit
104: usage range frequency calculation unit
105: usage range frequency storage unit
106, 208, 308: deviation calculation unit
204, 304: position specifying unit
205, 305: position storage unit
206: basic operation route specifying unit
207: basic operation route storage unit
306: storage location specifying unit
307: storage location storage unit
404: change detection unit

The invention claimed is:
1. A service lifespan prediction device comprising:
an operation history accumulation unit that accumulates an operation history of a part that forms a vehicle;
a service lifespan prediction unit that calculates a cumulative stress and a stress increase rate on the part based on the operation history accumulated in the operation history accumulation unit and predicts a remaining travel distance until the part reaches the end of a service lifespan based on the cumulative stress and the stress increase rate;
a usage range frequency calculation unit that calculates a usage range frequency of an internal combustion engine based on a rotational speed and a load of the internal combustion engine mounted on the vehicle;
a usage range frequency storage unit that stores the usage range frequency calculated by the usage range frequency calculation unit; and
a deviation calculation unit that calculates deviation between a latest value of the usage range frequency stored in the usage range frequency storage unit and a previous value of the usage range frequency,
wherein, in a case where the deviation between the latest value of the usage range frequency calculated by the deviation calculation unit and the previous value of the usage range frequency is equal to or greater than a threshold value, the service lifespan prediction unit calculates the stress increase rate based only on the operation history accumulated after the latest value of the usage range frequency is calculated.

2. The service lifespan prediction device according to claim 1, further comprising:
   a position specifying unit that specifies a position of the vehicle;
   a position storage unit that stores the position specified by the position specifying unit;
   a usage environment specifying unit that specifies usage environment of the vehicle based on the position stored in the position storage unit; and
   a usage environment storage unit that stores the usage environment specified by the usage environment specifying unit,
   wherein the deviation calculation unit calculates deviation between a latest value of the usage environment stored in the usage environment storage unit and a previous value of the usage environment, and
   wherein, in a case where the deviation between the latest value of the usage environment calculated by the deviation calculation unit and the previous value of the usage environment is equal to or greater than a threshold value, the service lifespan prediction unit calculates the stress increase rate based only on the operation history accumulated after the latest value of the usage environment is calculated.

3. The service lifespan prediction device according to claim 2,
   wherein the usage environment specifying unit specifies an operation route of the vehicle based on the position stored in the position storage unit, and sets the operation route as the usage environment when the operation route matches multiple times.

4. The service lifespan prediction device according to claim 2,
   wherein the position specifying unit specifies the position when the internal combustion engine mounted on the vehicle is cold-started, and
   wherein the usage environment specifying unit sets the position as the usage environment when the position stored in the position storage unit matches multiple times.

5. The service lifespan prediction device according to claim 1, further comprising:
   a change detection unit that detects a change in an automobile registration number plate attached to the vehicle,
   wherein, in a case where the change detection unit detects the change in the automobile registration number plate, the service lifespan prediction unit calculates the stress increase rate based only on the operation history accumulated after the change in the automobile registration number plate is detected.

6. A service lifespan prediction method comprising:
   a) accumulating an operation history of a part that forms a vehicle;
   b) calculating a cumulative stress and a stress increase rate on the part based on the operation history accumulated in step a) and predicting a remaining travel distance until the part reaches the end of a service lifespan based on the cumulative stress and the stress increase rate;
   c) calculating a usage range frequency of an internal combustion engine based on a rotational speed and a load of the internal combustion engine mounted on the vehicle;
   d) storing the usage range frequency calculated in step c); and
   e) calculating deviation between a latest value of the usage range frequency stored in step d) and a previous value of the usage range frequency, wherein
   when the deviation between the latest value of the usage range frequency calculated in step e) and the previous value of the usage range frequency is equal to or greater than a threshold value, the stress increase rate is calculated in step b) based only on the operation history accumulated after the latest value of the usage range frequency is calculated.

\* \* \* \* \*